United States Patent Office 2,951,799
Patented Sept. 6, 1960

2,951,799
PHOTOXIDATION PROCESSES USING HETEROCYCLIC PHOTOSENSITIZERS

Dexter B. Sharp, Vandalia, Ohio, assignor to Monsanto Chemical Company, St. Louis, Mo., a corporation of Delaware No Drawing. Filed Nov. 13, 1957, Ser. No. 696,064

7 Claims. (Cl. 204—162)

The present invention is directed to photoxidation processes utilizing a porphyrin having heterocyclic meso-substitution as a photoxidation catalyst.

The invention is further directed to the photoxidation of olefins in the presence of porphyrins having heterocyclic meso-substituents.

The invention is further directed to certain meso-heterocyclic-substituted compounds as new compounds. In particular, the invention is directed to $\alpha,\beta,\gamma,\delta$-tetrakis(heterocyclic)porphins in which the heterocyclic group is a 5- or 6-membered ring compound containing unsaturation and containing an oxygen, nitrogen, or sulfur hetero atom.

The porphyrins, of course, are the class of compounds in which four pyrrole nuclei are linked together in a circular pattern by four carbon atoms so that a great ring containing 16 atoms is formed. While the formulae herein depict the unsaturated porphyrin ring system in conventional manner, it will be recognized that the double-bonds are capable of shifting to various resonance states and that the photosensitizing use of the catalysts described here in is contemplated by the present invention regardless of what the actual predominant resonance state may be.

The compounds suitable for use as photocatalysts in the present invention will be in general conformity to the following formula:

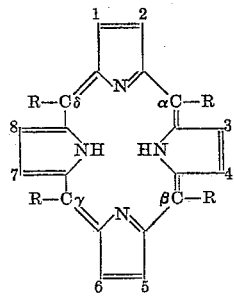

in which at least one R is a heterocyclic group; any R's which are not heterocyclic groups can be hydrogen, alkyl, or phenyl groups. R can be such monocyclic heterocyclic groups as furyl, thienyl, pyridyl, thiazolyl, tetrazolyl, diazolyl, triazolyl, pyrryl, quinolyl, oxazolyl, oxadiazolyl, pyrazolyl, imidazolyl, etc.; bicyclic or other polycyclic heterocyclic groups are also applicable, particularly those having a benzene or naphthalene ring fused to a monocyclic heterocyclic group, such as one of the foregoing monocyclic groups; for example, such polycyclic groups as indolyl, benzothienyl, benzofuryl, benzooxazolyl, benzoisoxazolyl, benzthiazolyl, benzimidazolyl, etc., are applicable. The named illustrative groups will ordinarily be used in $\alpha,\beta,\gamma,\delta$-tetraheterocyclic porphins. While heterocyclic groups in general are applicable in the photoxidation catalysts employed in the present process, the heterocyclic groups are preferably 5- or 6-membered ring compounds, per se, or fused to aromatic structures, with 1 to 4 hetero atoms such as oxygen, nitrogen and sulfur, and containing unsaturation, particularly conjugated unsaturation; such heterocyclic groups apparently cause photoxidizing activity in the porphyrin structure by providing more resonance possibilities, having an effect similar to the aryl groups in the meso-aryl porphyrin catalysts employed in the photoxidation processes described and claimed in my copending application S.N. 696,063, filed of even date herewith. The point of attachment to the meso-carbon atoms of the porphyrin can be at any ring member of the heterocyclic radical. However, it is ordinarily attached at a carbon atom of the heterocyclic compound at which a carboxaldehyde group is readily formed, for example, at an $\alpha$-carbon atom, i.e., a carbon atom adjacent to a hetero atom. Heterocyclic carboxaldehydes are generally used in the preparation of the meso-heterocyclic porphyrins, as will be described hereinafter.

The $\alpha,\beta,\gamma,$ and $\delta$ positions in the above formula are the meso positions; the catalysts for use in the present process can be designated as meso-heterocyclic porphyrins, or as ms-heterocyclic porphyrins.

While the presence of any one or more of the above or other heterocyclic groups at the designated positions in the porphyrin leads to activity as a photoxidizing catalyst, it is preferred to utilize four heterocyclic groups in the catalysts. The porphyrins containing four heterocyclic groups are more readily prepared, and also generally have greater photoxidizing activity than do catalyst containing a smaller number of heterocyclic substituents. Of course, the porphyrins can have substituents at other positions, particularly at the numbered positions in the above formula, for example, such substituents as ethyl, methyl, vinyl, and propionic acid groups, etc., or phenyl groups.

It will be understood that the use of the metal chelate forms of the above structure is also included in the present invention. Such metals as, for example, zinc, magnesium, copper, iron, nickel, cobalt, lead, etc. can readily be chelated with porphyrins, and the resulting chelates are effective as photosensitizers. The chelates can be represented by the above porphyrin structure, with the following bonding between the metal and the pyrrole nitrogens:

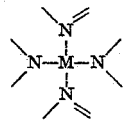

Various other metals also form chelates of the described porphyrins which are effective as catalysts, for example, alkali and alkaline earth metals such as sodium, potassium, calcium, etc. It will be understood that when porphyrins are described or claimed herein, generically or specifically, by structural formula or otherwise, the metal chelate forms as well as the free bases are contemplated.

The prior art discloses the use of chlorophyll as a catalyst in certain photoxidation procedures. However, chlorophyll does not have the aromatic activated porphyrin structure of the catalysts used in the present invention and is far inferior in activity and stability to the catalysts of the present invention.

It is an object of the present invention to improve the efficiency and yields in photoxidation reactions by the use of superior photosensitizing catalysts. It is a further object to render photoxidation procedures more practical and economical by the use of photosensitizers of improved stability. It is a further object to employ photosensitizers having good solubility in organic substrates. It is a further object to utilize superior photosensitizers which can be prepared by procedures of organic synthesis.

The terms "photoxidizing," "photoxidation," "photosensitized," etc. as used herein in the specification and claims are intended to cover true photosensitized oxidation reactions in which light in the presence of a photosensitizing catalyst causes the oxidation; the terms are not intended to include autoxidations, or oxidations proceeding by a free radical mechanism in which irradiation with light serves to initiate free radicals. The true photosensitized oxidation reactions are characterized by the fact that the rate of the reaction is proportional to the intensity of irradiation at both high and low intensities, and the fact that ordinary oxidation inhibitors do not retard the reaction.

The photoxidation reaction of the present invention can be postulated according to the following equations:

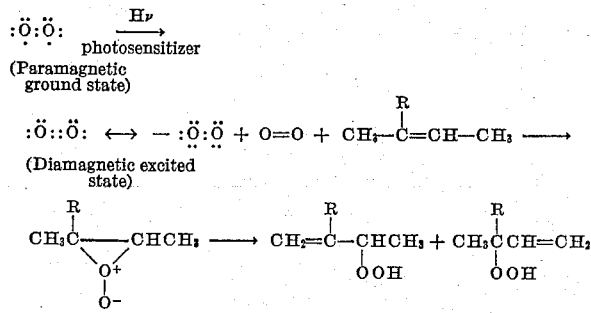

In these reactions a photosensitizer must be present to catalyze the conversion of the molecular oxygen in the ground state to an activated polarizable state. Light is also necessary to effect this reaction. The irradiating light can vary considerably in wave length, wave lengths in the visible regions being preferred. The light can be monochromatic or polychromatic. Light of wave lengths in the range of about 3600 to about 8000 angstroms has been found very suitable. While light in the ultraviolet region, particularly the near ultraviolet region, can be used as it is effective to some extent in causing photoxidation, it is desirable to avoid use of light in these regions as it tends to catalyze autoxidations and other free-radical type reactions. High-energy ultraviolet light may also cause accelerated catalyst photodecomposition. The speed of the photoxidation reaction is proportional to the intensity of the irradiation; this relationship is very important, as it makes it possible to obtain reaction rates suitable for commercial production by merely providing high power light sources.

The amount of meso-heterocyclic porphyrin photosensitizer can vary widely, but ordinarily only small "catalytic" amounts will be used. For example, amounts of 0.005% by weight based on the weight of substrate are satisfactory. Various other amounts, for example, from about 0.0001% up to about 1% or more by weight of substrate such as propylene trimer or other olefin can be used. The photoxidation will generally be conducted in the absence of solvent. However, various organic solvents can be used for the reaction, and even water may be present during the reaction. The use of solvent will be advantageous in some cases to aid the mutual intersolubility of substrate and particular meso-heterocyclic porphyrin photosensitizers. Examples of a few suitable solvents are aromatic hydrocarbons, such as benzene, toluene, etc.; acylic and cyclic alkanes, for examples, n-hexane and cyclohexane; amines, for examples, pyridine, etc. Temperature does not have a strong influence on the photoxidation reaction. However, it is desirable to keep the substrate in the liquid or solution state, usually by temperatures below the boiling point at atmospheric pressure. Temperatures of the order of room temperature, for example, 20 to 30° C. will generally be used. Other temperatures, for example, from below 0° to 100° C. or higher can be used; if desired the reaction can be conducted at superatmospheric pressures to maintain the liquid state at higher temperatures.

The rate of oxygen addition during the photoxidation can vary greatly, although it may affect the time required to complete the reaction. Generally, the addition rate will be at least sufficient to provide all the oxygen which can be absorbed and utilized at a given time. Various types of agitators, mixers, and gas-liquid contact apparatus and procedures can be utilized to promote rapid absorption of oxygen by the substrate, thereby insuring a sufficiently high effective oxygen concentration; the concentration of oxygen can also be increased by use of pressure. Oxygen gas can be utilized as such, or it can be admixed with nitrogen or other gases. Air is an oxygen-containing gas which is very suitable for use in the photoxidation of substrate; it will be understood that the term "oxygen" as used in the present specification and claims includes molecular oxygen in air or in admixture with other gases, or dissolved in or admixed with liquids, or generated in situ, as well as oxygen per se.

The photoxidation process of the present invention can be applied to any photoxidizable substrates; the inventive feature of the process is essentially the discovery of the superior photosensitizing activity of the catalysts described herein, and this photosensitizing activity is valuable in the photoxidation of any substrates. Representative substrates are, for example, such open chain (aliphatic) and cyclic mono-olefins as 1-heptene, 1-octene, 1-dodecene, 1-hexadecene, diisobutylene, cyclopentene, 1 - methyl - 1 - cyclopentene, cyclohexene, 1-methylcyclohexene, 1,2-dimethylcyclohexene, cyclooctene, α-pinene, dipentene, limonene, carvomenthene, terpinolene, propylene trimers, tetramers, pentamers, etc., all of which are photo-oxidized to hydroperoxides, presumably by means of an allylic shift as represented by:

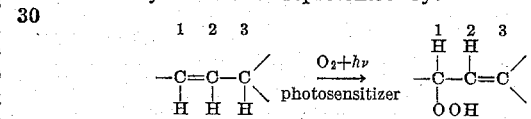

The hydroperoxide products can readily be reduced to alcohols, or used in other ways as organic intermediates for the production of useful compounds. The photoxidation process of the present invention converts cyclic conjugated dienes to endocyclic peroxides, and open chain conjugated dienes to exocyclic peroxides; representative of dienes which are so converted are, for example, cyclopentadiene, 1,3-cyclohexadiene, 2-methyl-1,3-cyclohexadiene, α-terpinene, α-phellandrene, α-pyronene, β-pyronene, 1,3-hexadiene, 1,3-dimethylbutadiene, 2,3-dimethylbutadiene, alloocimene, etc. Other substrates which can be photoxidized in the process of the present invention are, for example, amines; thioureas, for example, thiourea; dienes of the sterol series, for example, ergosterol; heterocyclic olefins, for example, furans; triolefins; olefinic acids, for example, oleic acid; fulvenes, for example, phenylfulvene; aldehydes; phenylhydrazones; semicarbazones, thiosemicarbazones, enol ethers, sulfinic acids, etc.; such groups as ester, amide, urethane, N-acetyl, phenyl, hydroxyl, Cl, Br, etc., even if adjacent to the oxidizable group in the foregoing types of substrates, do not ordinarily interfere in the photoxidation reaction. It will be appreciated, of course, that the foregoing substrates will vary in their ease of photoxidation, photoxidation rates, etc., and in the products resulting from photoxidation; such variations, however, do not affect the photosensitizing activity of the meso-heterocyclic porphyrin catalysts in the photoxidation reactions. It is evident from the foregoing, however that the present process concerns introducing oxygen into the molecule of the organic compound without destruction thereof, i.e., actual addition of the oxygen to the compound, as a result of subjecting the organic compound capable of adding oxygen under the influence of light and a photosensitizing catalyst to simultaneous light irradiation and contact with oxygen and a meso-heterocyclic porphyrin catalyst.

The propylene polymers referred to above are unsaturated olefins obtained by polymerization of propylene. In particular, propylene trimer used as the substrate in several examples below was obtained by acid-catalyzed homoaddition of propylene to itself. The general method involves passage of propylene at superatmospheric pressure over a phosphoric acid-impregnated solid support at temperatures greater than 100° C., collecting the polymerized hydrocarbon and fractionating to isolate the trimer, tetramer, pentamer, etc., fractions. The trimer utilized herein was obtained from Enjay Company and has a boiling range of 260–290° F., and sp. gr. 20/20 of 0.736–0.740. A minimum of 100 p.p.m. t-butylcatechol is added as oxidation inhibitor. In early photoxidation runs, this was removed by adsorption, but the photoxidation proceeds equally as well in its presence or absence. The propylene pentamer used also was obtained from Enjay and has the following properties: Enjay "Pentadecene," sample No. 19–E–1, boiling point 249–268° C., API gravity of 60° F., 41.7. Propylene tetramer used was Enjay "Tetrapropylene" and has a boiling point of 350–445° F., sp. gr. 20/20 of 0.768–0.781.

The following examples illustrate certain embodiments of the invention, but the invention is to be considered as limited thereto.

EXAMPLE 1

A conventional 20-unit Precision Scientific Warburg apparatus was provided with a Precision Scientific double-circle, 5000-volts "standard cool white" fluorescent light, especially fabricated to fit the apparatus. The light was immersed in the constant-temperature water bath to provide uniform illumination of the Warburg vessels from below.

The following compounds in the specified amounts were made up to 100 ml. in propylene trimer (free of inhibitors).

| Solution No. | Compound | Weight (mg.) |
|---|---|---|
| 1 | $\alpha,\beta,\gamma,\delta$-tetraphenylporphin | 7.2 |
| 2 | $\alpha,\beta,\gamma,\delta$-tetrakis(2-furyl)porphin | 6.7 |
| 3 | $\alpha,\beta,\gamma,\delta$-tetrakis(2-thienyl)porphin | 7.5 |

In solutions 2 and 3 the solid compounds were added to benzene prior to addition to the propylene trimer in order to effect solution; gentle warming was also employed to make the compounds dissolve more readily. The solutions were intended to provide a catalyst concentration of about $1.17 \times 10^{-4}$ moles per liter. Portions of the solutions—3 ml.—were then placed in the vessels of the Warburg apparatus of Example 1, and the oxygen uptake under illumination was measured at 25° C., as recorded below:

*Oxygen absorbed in microliters*

| Solution No. | Time in Minutes | | | | |
|---|---|---|---|---|---|
| | 15 | 25 | 45 | 60 | 75 |
| 1 | 98 | 192 | 325 | 448 | 453 |
| 2 | 64 | 113 | 187 | 251 | 267 |
| 3 | 146 | 293 | 445 | 584 | 609 |

In a photoxidation procedure employing such prior art catalysts as methyl violet B, tetrabromofluorescein sodium salt, fluorescein sodium salt, and brilliant indocyanine 6BA CF under substantially equivalent conditions, the best oxygen absorption was 49 microliters at 60 minutes for the tetrabromofluorescein. It is apparent that the above 2-thienyl and 2-furyl porphyrins are very effective photosensitizers, the 2-thienyl compound being even better than tetraphenylprophin.

The photoxidation catalyzing rates of meso-heterocyclic prophyrins, as measured by oxygen absorption of propylene trimer in one hour under standard illumination, are much greater than that of such natural materials as hemin, as shown in the following table.

| Catalyst | Amount (microliters) of Oxygen Absorbed (Corrected for Dark Reaction) |
|---|---|
| $\alpha,\beta,\gamma,\delta$-tetrakis(2-furyl)porphin | 171 |
| $\alpha,\beta,\gamma,\delta$-tetrakis(2-thienyl)porphin | 418 |
| Hemin | 56 |

The following examples illustrate procedures which can be used in preparing the meso-heterocyclic-porphyrins utlized in the photoxidation procedures of the present invention. In general, the meso-heterocyclic-prophyrins are prepared by reaction of pyrrole with a particular heterocyclic carboxaldehyde to obtain the corresponding meso-heterocyclic porphyrin (Ball, Dorough and Calvin, J. Am. Chem. Soc., 68, 2278 (1946)). Various porphyrin derivatives can be obtained by simply employing various heterocyclic carboxaldehydes or various substituted pyrroles in their preparation. Or, alternatively, various heterocyclic-substituted compounds can be employed which will condense to form the pyrrole rings as well as the great porphyrin ring (Linstead et al., J. Chem. Soc., 1937, 929; 1940, 1079). For example, $\alpha,\alpha'$-diphenylmaleimide and thienylacetic acid will condense upon heating in the presence of zinc, copper, or magnesium salts or oxides, for example, zinc thienylacetate, cuprous chloride or magnesium oxide to 1,2,3,4,5,6,7,8-octaphenyl-$\alpha,\beta,\gamma,\delta$-tetrathienylporphin (Helberger and Rebay, Ann., 535, 181 (1938)). In preparing the porphyrins, mixtures of substituted and unsubstituted pyrroles and mixtures of various heterocyclic compounds along with other reactants can be employed to obtain porphyrins containing various combinations of substituted and unsubstituted pyrrole groups, and various heterocyclic groups, as well as other meso-substituents. Examples of a few of the meso-heterocyclic porphyrins applicable as photoxidation catalysts in my process, in addition to those disclosed above are: 1,5-dimethyl-$\alpha,\beta,\gamma,\delta$-tetrakis(2-thienyl)porphin, $\alpha,\beta,\gamma,\delta$-tetrapyridyl-3,4,7,8-tetraphenylporphin, 1,3,5,8-tetraisopropyl-$\alpha,\beta,\gamma,\delta$-tetraindolylporphin, 1,3,5,8-tetraethyl-$\alpha$-thiazolylporphin, 1,3,5,8-tetramethyl-meso-dipyrryl-meso-diphenylporphin, $\alpha,\beta,\gamma,\delta$-tetrakis(diazolyl-1,2,3,4,5,6,7,8-octaphenylporphin etc.

EXAMPLE 2

A Carius tube was charged with 20 ml. pyridine 10 grams zinc acetate and 10 ml. pyrrole. The tube was then charged with 14 ml. of 2-thiophenecarboxaldehyde, flushed with nitrogen, sealed, and heated in a furnace at 200° C. for 48 hours. The tube was opened, rinsed with acetone, and filtered. The crystalline solids were dissolved in chloroform and stirred with 100 ml. aqueous hydrochloric acid. Concentrated ammonium hydroxide was then added, and the chloroform layer was separated and chromatographed on $Al_2O_3$. Evaporation of the first eluate gave 1.1 grams of blue-purple solid $\alpha,\beta,\gamma,\delta$-tetrakis($\alpha$-thienyl)porphyrin, while evaporation of the second eluate gave 2.27 grams of this product.

EXAMPLE 3

A Carius tube was charged with 20 ml. pyridine, 10 grams zinc acetate, 10 ml. pyrrole, and 12.5 ml. of furfural. The tube was flushed with nitrogen, sealed, placed in a furnace, and heated to 200° C. for 48 hours. The $\alpha,\beta,\gamma,\delta$-tetrakis($\alpha$-furyl)porphin was isolated by extraction and chromatographic procedures as in Example 2.

EXAMPLE 4

A Carius tube was charged with 10 ml. pyrrole, 20 ml. pyridine, 10 grams zinc acetate, and 16 grams pyridine 4-carboxaldehyde. The tube was flushed with nitrogen, sealed, and placed in a furnace and heated to 200° C. for several hours. The tube was cooled and opened, and the reaction mixture was digested with methanol to give a rust-colored solid. A portion of the solid was chromatographed on $Al_2O_3$ (F-1 grade) with pyridine. The pyridine was evaporated from the eluate to give beautiful blue crystals of $\alpha,\beta,\gamma,\delta$-tetrakis(4-pyridyl)porphin which would not redissolve in pyridine. As an alternate isolation procedure, a portion of the solid obtained by methanol digestion of the reaction mixture was successively washed with solutions of pyridine and methanol varying from 5% pyridine up to 60% pyridine to give a dull blue-violet solid. The blue-violet solid was then refluxed in pyridine and then filtered from the pyridine; spectrographic analysis indicated that the $\alpha,\beta,\gamma,\delta$-tetra(4-pyridyl)porphin obtained by this extraction procedure was purer than that obtained by chromatographing. The $\alpha,\beta,\gamma,\delta$-tetrakis(4-pyridyl)porphin exhibited good photosensitizing activity in the photoxidation of propylene tetramer.

Further discussion of the preparation of prophyrins appears in my copending application S.N. 696,063, filed of even date herewith and any of the procedures taught therein are applicable to the preparation of the meso-heterocyclic-porphyrins utilized in the present invention; in particular, the solvent-free preparation taught therein is very suitable for the preparation of meso-heterocyclic porphyrins. Moreover, the photoxidation processes of the present invention can be applied to the photoxidation of any of the substrates utilized in the processes of the aforesaid copending application. In addition, the catalysts of the present invention can be utilized in various chelate forms in the manner illustrated by the activity of the chelate forms of the catalysts in the aforesaid copending application. The utility of the present catalysts is further demonstrated by their applicability in the preparation of isoprene as disclosed in the copending application of John R. LeBlanc and myself, S.N. 696,062, filed of even date herewith.

What is claimed is:

1. A process for introducing oxygen into an organic compound which comprises simultaneously subjecting an organic compound capable of adding oxygen under the influence of light and a photosensitizing catalyst to light irradiation and contact with oxygen and an $\alpha,\beta,\gamma,\delta$-tetrakis (heterocyclic) porphin, thereby introducing oxygen into the molecule of the said organic compound without destruction thereof in which the heterocyclic substituent is selected from the group consisting of 5- and 6-membered ring compounds containing 1 to 4 hetero atoms selected from the group consisting of oxygen, nitrogen, and sulfur, and containing conjugated double bonds.

2. The process of claim 1 in which the heterocyclic group is a 5-membered ring compound containing one hetero atom.

3. The process of claim 1 in which the catalyst is $\alpha,\beta,\gamma,\delta$-tetrakis(2-thienylporphin).

4. The process of claim 1 in which the catalyst is $\alpha,\beta,\gamma,\delta$-tetrakis(2-furyl)porphin.

5. A process for introducing oxygen into an organic compound which comprises simultaneously subjecting an organic compound capable of adding oxygen under the influence of light and a photosensitizing catalyst to irradiation with light of wave length in the range of 3600 to 8000 angstroms and contact with oxygen and an $\alpha,\beta,\gamma,\delta$-tetrakis (heterocyclic) porphin in which the heterocyclic group is a 5-membered ring group containing conjugated unsaturation and sulfur as the sole hetero atom in the ring, thereby introducing oxygen into the molecule of the said organic compound without destruction thereof.

6. A process for introducing oxygen into an organic compound which comprises simultaneously subjecting an organic compound capable of adding oxygen under the influence of light and a photosensitizing catalyst to irradiation with light of wave length in the range of 3600 to 8000 angstroms and contact with oxygen and an $\alpha,\beta,\gamma,\delta$-tetrakis (heterocyclic) porphin in which the heterocyclic group is a 5-membered ring group containing conjugated unsaturation and oxygen as the sole hetero atom in the ring, thereby introducing oxygen into the molecule of the said organic compound without destruction thereof.

7. The process of claim 1 in which the catalyst is $\alpha,\beta,\gamma,\delta$-tetrakis(4-pyridyl) porphin.

References Cited in the file of this patent

UNITED STATES PATENTS

| | | |
|---|---|---|
| 2,165,130 | Coe | July 4, 1939 |
| 2,681,346 | France | June 15, 1954 |
| 2,732,337 | Togel | Jan. 24, 1956 |

UNITED STATES PATENT OFFICE
CERTIFICATE OF CORRECTION

Patent No. 2,951,799 September 6, 1960

Dexter B. Sharp

It is hereby certified that error appears in the above numbered patent requiring correction and that the said Letters Patent should read as corrected below.

Column 5, line 20, after "is" insert -- not --; column 6, 43, after "(diazolyl" insert a closing parenthesis.

Signed and sealed this 5th day of February 1963.

(SEAL)
Attest:

ERNEST W. SWIDER
Attesting Officer

DAVID L. LADD
Commissioner of Patents